O. EICK.
PASTEURIZER.
APPLICATION FILED APR. 24, 1916.
1,356,055.
Patented Oct. 19, 1920.
6 SHEETS—SHEET 2.
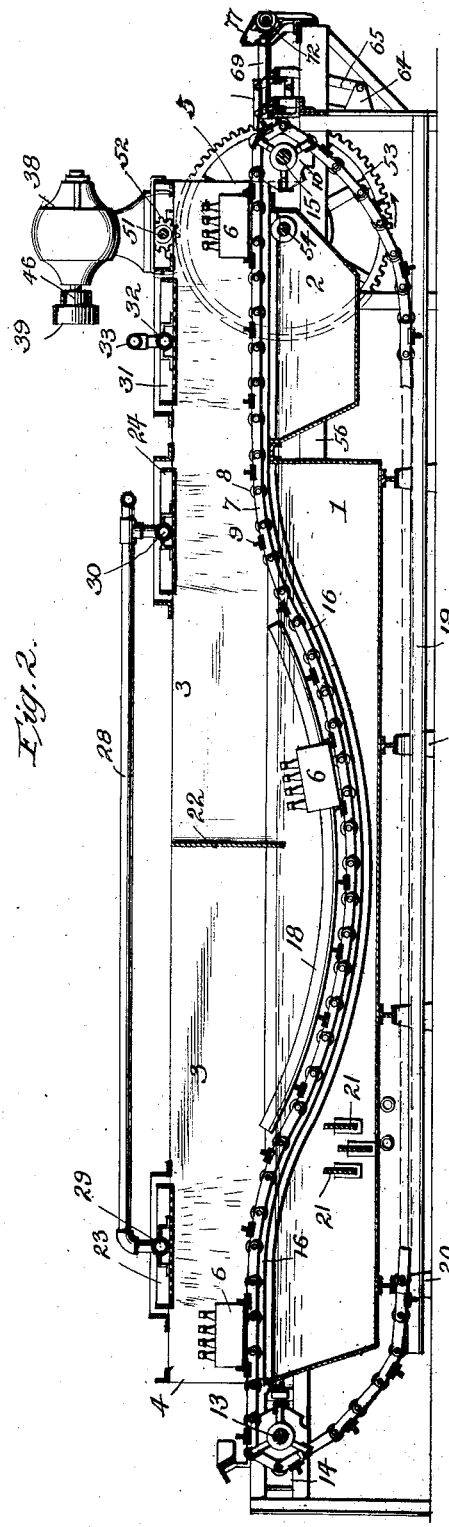
Inventor
Otto Eick,
Attorneys

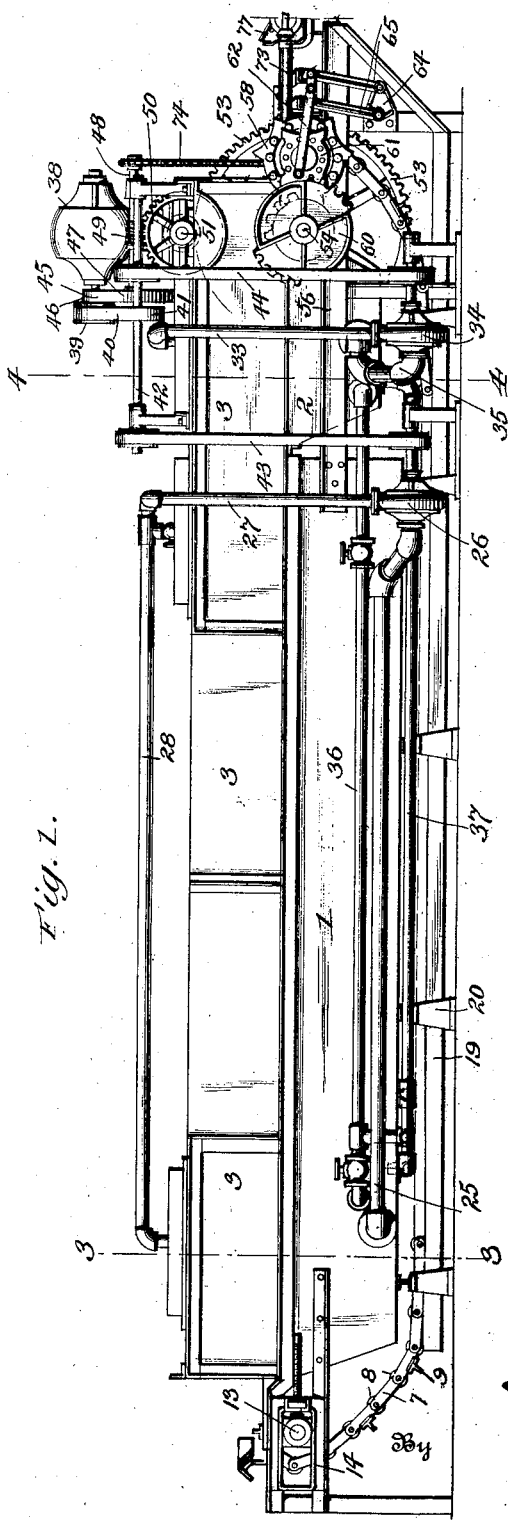

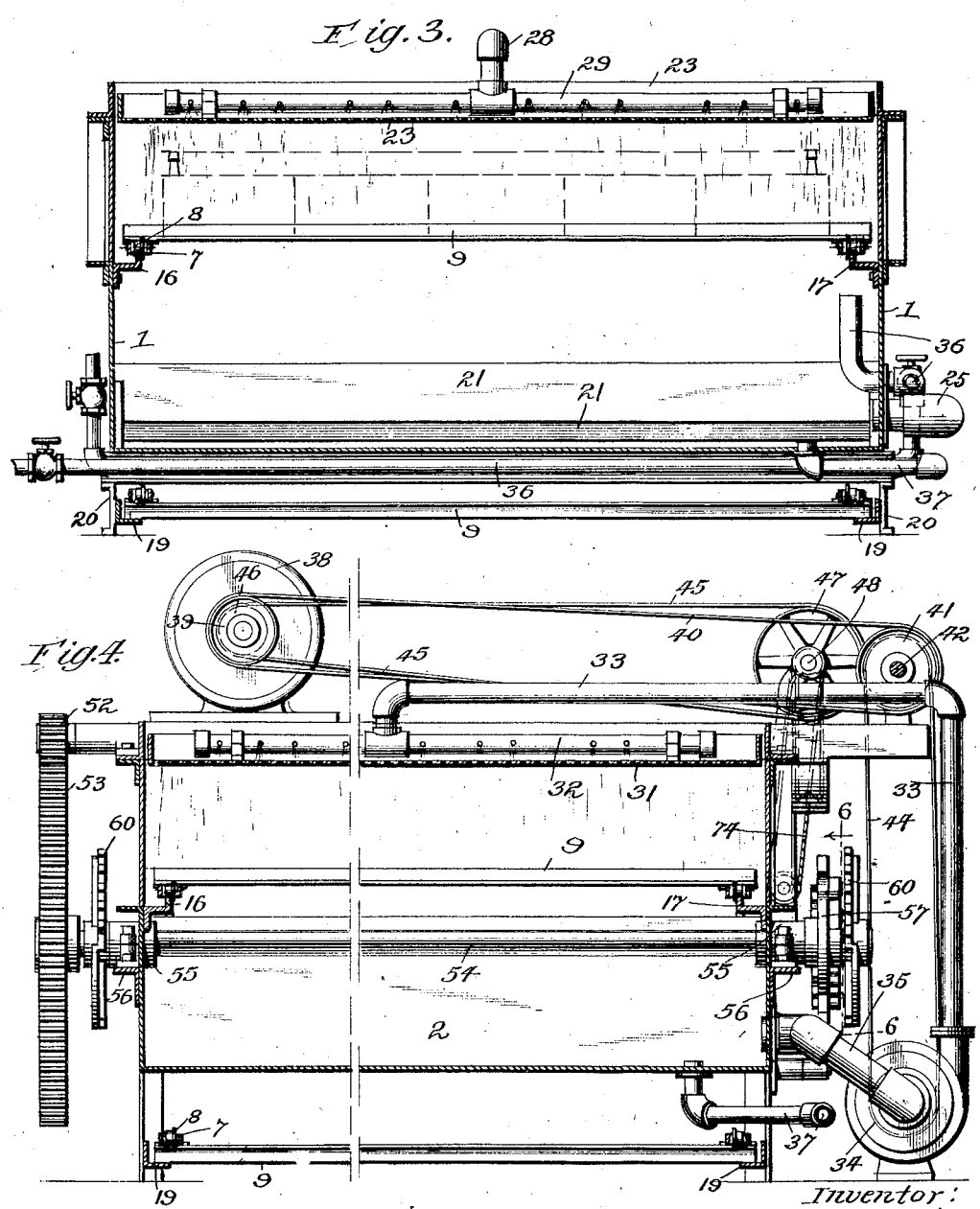

O. EICK.
PASTEURIZER.
APPLICATION FILED APR. 24, 1916.

1,356,055.

Patented Oct. 19, 1920.
6 SHEETS—SHEET 4.

Inventor
Otto Eick,

By Dodge and Sons,
Attorneys

O. EICK.
PASTEURIZER.
APPLICATION FILED APR. 24, 1916.

1,356,055.

Patented Oct. 19, 1920.
6 SHEETS—SHEET 6.

Inventor
Otto Eick,
By Dodge and Sons,
Attorneys.

UNITED STATES PATENT OFFICE.

OTTO EICK, OF ST. LOUIS, MISSOURI.

PASTEURIZER.

1,356,055. Specification of Letters Patent. Patented Oct. 19, 1920.

Application filed April 24, 1916. Serial No. 93,199.

*To all whom it may concern:*

Be it known that I, OTTO EICK, a citizen of the United States, residing at St. Louis, in the State of Missouri, have invented a certain new and useful Improvement in Pasteurizers, of which the following is a specification.

Figure 5:
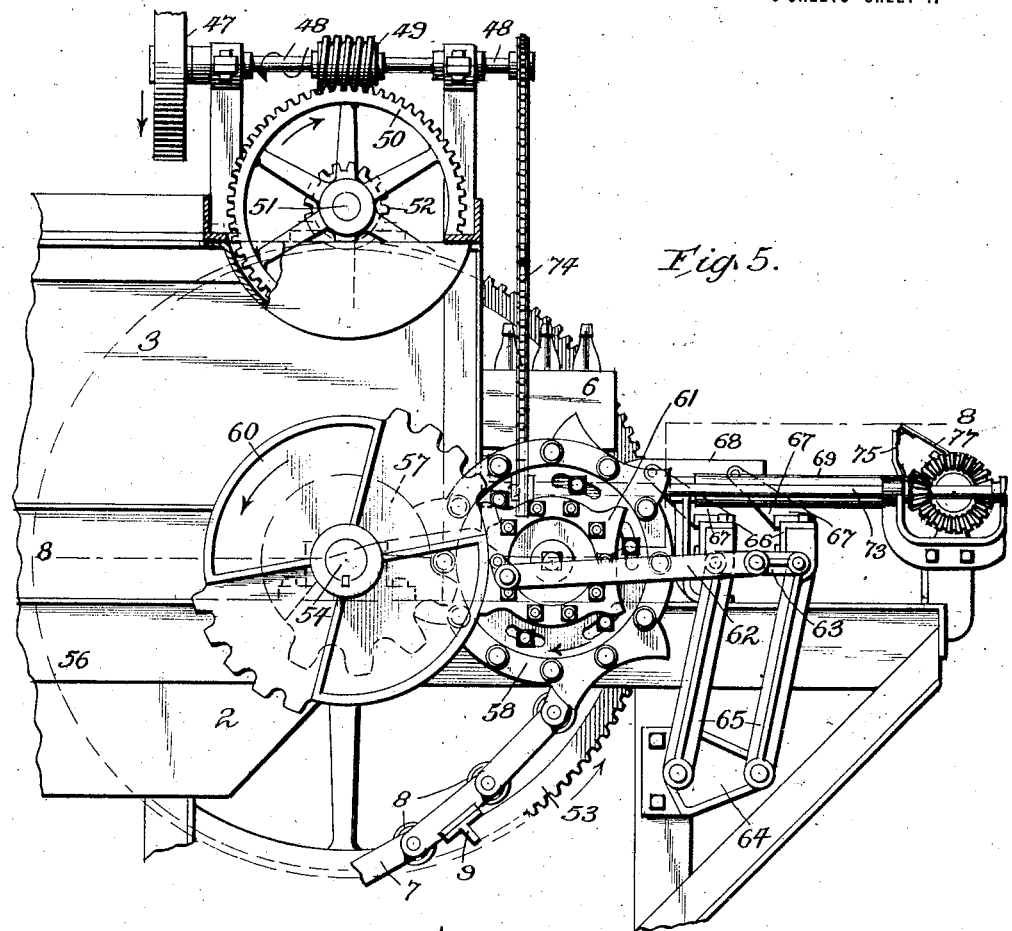
Figure 6:
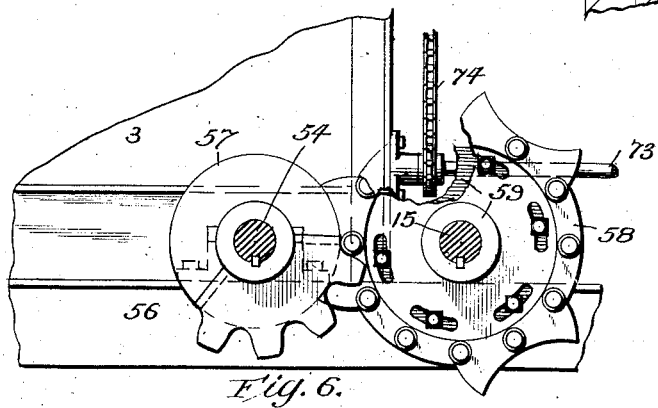
Figure 7:
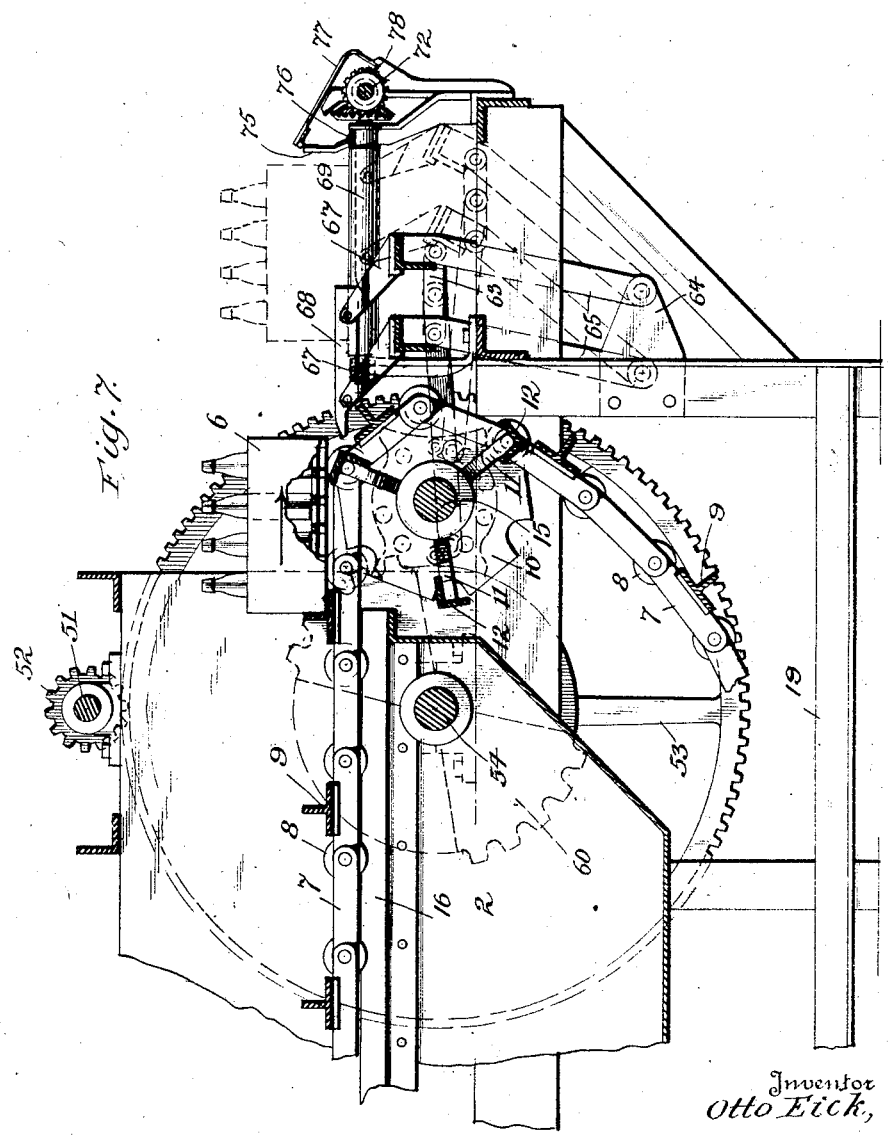
Figure 8:
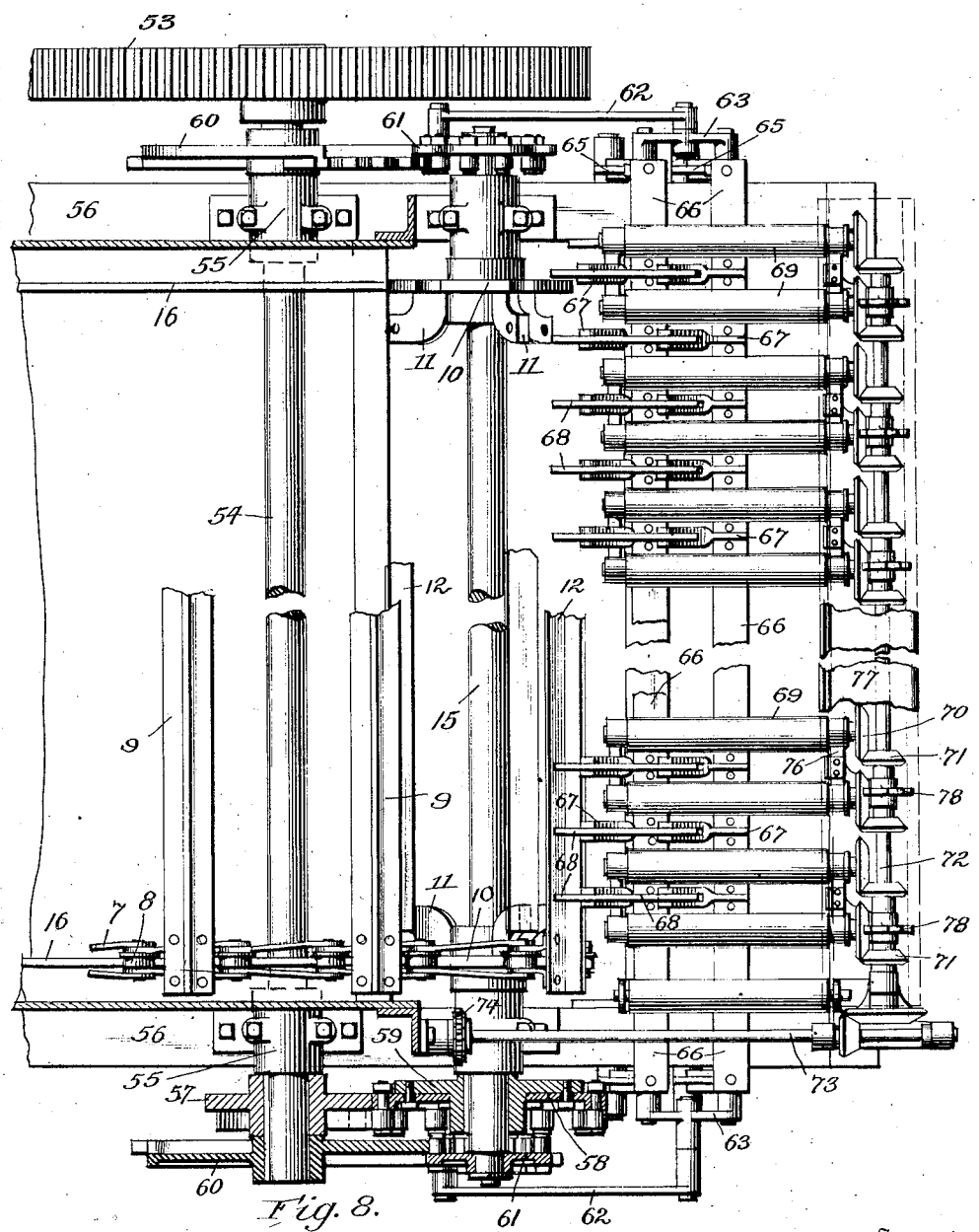

My present invention pertains to an improved pasteurizer, the construction and advantages of which will be hereinafter set forth, reference being had to the annexed drawings, wherein:

Figure 1 is a side elevation of the apparatus;

Fig. 2 a longitudinal vertical sectional view thereof;

Fig. 3 a transverse vertical sectional view, on the line 3—3 of Fig. 1, the driving mechanism at the rear of the machine being omitted;

Fig. 4 a similar view on the line 4—4 of Fig. 1;

Fig. 5 a side elevation of the driving and conveying mechanisms at the discharge end of the machine;

Fig. 6 a detail sectional view on the line 6—6 of Fig. 4;

Fig. 7 a longitudinal vertical sectional view of the discharge end of the apparatus; and Fig. 8 a horizontal sectional view on the line 8—8 of Fig. 5.

The main object of the present invention is to provide a simple and efficient apparatus of the nature specified, wherein two separate and independent tanks are used, the water in the first tank being employed to pasteurize the contents of the containers which are passed therethrough, the water being likewise pumped from said tank and allowed to drop back therein, over the containers at both the incoming and discharge ends of the tank, to first preheat the containers and as they pass out to lower their temperature, while the second tank is utilized as a catch basin or receptacle only, for the final cooling or chilling water.

Means, such as an endless carrier, is employed to traverse the containers through the first tank, thence over the second tank and onto an automatically operating transfer and conveying mechanism.

By the employment of a single tank, and the use of the water therein over and over again to effect the steps of preheating, pasteurizing and partial cooling of the containers substantial economies in operation are effected and the apparatus is, as well, at once simplified.

Referring to the drawings, 1 denotes the main or pasteurizing tank, and 2 the second tank or catch basin for the cooling water. A cover or hood 3 extends over the two tanks, being open at both ends, as at 4 and 5, Fig. 2, for the reception and discharge of the open-bottom crates 6 in which the bottles are placed preparatory to their introduction into the apparatus.

A pair of endless chains 7, having rollers 8 and connected by T-shaped cross-bars 9, form the conveyer. The chains at the intake and discharge ends of the apparatus pass about spider-like drums, each comprising a pair of notched disks 10, see Figs. 7 and 8, from which extend brackets or arms 11, to which are secured L cross-bars 12. Shaft 13, upon which the drum is mounted at the intake of the apparatus is adjustably supported in ways 14, while the other drum is secured upon a driven shaft 15, the means for driving which will presently appear. The notches in the disks or heads are adapted to receive the rollers or wheels 8, as best shown in Fig. 7.

A pair of oppositely-disposed tracks 16 and 17, of like contour, are secured to the inner side walls of tank 1 and the hood 3, the tracks curving downwardly toward the bottom of said tank a short distance from the intake end thereof, and likewise curving upwardly toward the discharge end of said tank. The tracks run straight over tank or basin 2.

Guard rails 18, Fig. 2, secured to the sides of tank 1, overlie the curved or depressed portions of the tracks, and by reason of contacting with the cross bars 9 cause the carrier to pass down into the tank and the crates 6 and the bottles therein to be submerged in the water. A pair of guide rails 19, secured to the supports 20 for the apparatus serve to guide the lower return run of the carrier.

Vertically-adjustable baffle-plates 21, (Fig. 2), are arranged transversely of the tank adjacent the head or intake end thereof, and tend in a measure to prevent too rapid circulation of the water in the tank, particularly the relatively cool water at the head end from passing too freely and intermingling too rapidly with the water in the other portion of the tank. An apron 22 is also employed to prevent draft through the apparatus, the lower edge of the apron dipping into the water to a slight extent.

Located adjacent the intake end of the tank is a pan 23, having a perforated bottom, while adjacent the other end of the tank 1 is a second pan 24, likewise having a perforate bottom.

A pipe 25, see Fig. 1, opens into the lower portion of tank 1, between the intake end thereof and the baffle-plates 21, said pipe extending to a pump 26, the discharge side whereof is connected by a pipe 27 to a longitudinal main 28. Said main, in turn, has connected to it perforate or spray pipes 29 and 30, located or discharging, respectively, into the pans 23 and 24. The water is thus drawn from the lower portion of the tank and discharged into the pans, from which it drops in streams or sprays onto the containers which are traversed beneath them, the water passing directly back into the tank, to be used over and over again. By the use of suitable steam pipes the water in the tank will be maintained at a temperature of, say 144° F., while the spray which passes from the pans will be found to have a lower temperature, or 137° F. The water passing from pan 23 will preheat the containers and gravitate to the bottom of the tank without, to any great extent, intermingling with the relatively warm water in the tank, such chilled water being then withdrawn and passed to pan 24, as well as pan 23. Descending from pan 24 it comes into contact with the relatively hot containers as they emerge from the water in the tank, pouring over said containers, and abstracting a certain amount of heat therefrom, the containers being thereby cooled and the water raised in temperature and passing directly back into the tank 1.

The partially-cooled containers then pass beneath a third spray pan 31, a perforated distributing pipe 32 therein receiving water from a pipe 33, leading from the discharge side of a pump 34, the intake of which is connected with the lower portion of tank or reservoir 2, by a pipe 35, see Figs. 1 and 4. This cooling water is kept at a temperature of, say, 96° F., cool water being introduced into the same, from time to time, to maintain such temperature. This may be done by means of a feed pipe 36, connected with said tank 2 and likewise with tank 1, suitable valves being placed in the line. A drain line 37 is also provided for said tanks.

The conveyer is designed to be given a step-by-step motion, though its motion might be slow and continuous. To effect its movement, and to likewise drive the pumps, I preferably employ an electric motor 38, mounted upon a suitable support adjacent one end of the machine. The motor-shaft is provided with a stepped pulley, about the larger member 39 of which passes a belt 40, said belt likewise passing about a pulley 41, secured upon a shaft 42. Said shaft also carries pulleys about which pass the driving belts 43 and 44 of the pumps. A belt 45 passes about the smaller member 46 of the motor pulley, the belt also passing around a pulley 47, secured upon a shaft 48, see Figs. 1, 4 and 5. Shaft 48 carries a worm 49, which meshes with a worm gear 50, secured upon one end of a cross-shaft 51, the opposite end of the shaft carrying a pinion 52, which meshes with a large gear 53 secured to a shaft 54, which extends transversely of the machine parallel to shaft 15, and mounted in suitable bearings 55 secured upon angle-bars 56 which extend alongside of the tanks. Upon one end of shaft 54, see Figs. 6 and 8, is secured the actuating member 57 of a Geneva movement, the coöperating roller toothed member 58 being adjustably secured to the flanged portion of a member 59, keyed, as shown in Figs. 6 and 8, to shaft 15. This connection affords the means for imparting a periodic rotation to shaft 15 and consequently a step-by-step movement to the conveyer or endless carrier for the container crates.

Shaft 54 also has secured to it a pair of actuating members 60 of further Geneva movements, said members coöperating with roller toothed members 61, which are mounted to rotate upon the ends of shaft 15. A pitman 62 extends from each of the said members 61, said pitmen in turn being pivotally connected to cross bars 63. Pivotally mounted, at each side of the machine, upon suitable brackets 64, is a pair of links or radius bars 65, said links being pivotally attached to the cross-bars 63, while the corresponding links of the opposite pairs are connected to each other by transversely-extending angle-bars 66. Extending upwardly from each of the angle-bars 66 is a plurality of arms 67, the arms inclining inwardly toward the conveyer, and to the upper end of each pair of arms there is pivotally secured a horizontally-disposed bar 68, the inner end of which is preferably inclined or downwardly beveled, as best shown in Fig. 7. These members 63, 65, 66, 67 and 68 constitute what may be termed a transfer table, which is periodically swung back and forth toward and from the conveyer by the pitmen 62, the table being adapted to receive the crates from the conveyer and to transfer and deposit them on a series of live rolls 69, the bars 68 being carried down (see Fig. 7) to a point below the upper portions of the rolls, as they move outwardly away from the discharge end of the tank.

The live rolls 69 are provided with gears 70, which intermesh with gears 71, mounted upon a shaft 72, said shaft being constantly driven from a shaft 73, which receives its motion through a sprocket chain 74, driven from the shaft 48.

If, for any reason, the live rolls should not function, or the conveyer onto which they deliver the crates should become clogged, I have provided means whereby the next series of crates which are fed out of the machine may push the series of crates then resting upon the live rolls outwardly over the shaft 72 and the gears carried thereby. To this end I provide a gear-housing, consisting of a normally vertically-disposed member 75, hinged at its lower end to a casting 76, and to the upper end of said member 75 there is hinged a rearwardly and downwardly inclined latch member 77, the rear, down-turned end of which takes into a notch 78 formed in the supporting casting in which the shaft 72 is mounted. The forcing of a series of crates against the vertically-disposed member 75 will throw the depending end or edge of member 77 out of the notch 78, and the member 75 will assume an inclined position over the gears, and the crates may then move upwardly over said member without any difficulty.

It is thought that the operation of the apparatus will be clearly understood from the foregoing description without a restatement thereof. It may, however, be said to be automatic, and the use of the water in the tank 1 for the purposes of preheating, pasteurizing and partially cooling is of material advantage. It may be again pointed out that there is no connection between tanks 1 and 2, and that there is no flow of water from one to the other, either directly or indirectly.

Having thus described my invention, what I claim is:

1. In a pasteurizer, the combination of a tank containing a pasteurizing liquid; means for passing containers through such liquid; means for withdrawing liquid from said tank and spraying the same over the containers as they pass into and emerge from the liquid, the liquid thus sprayed falling back into the tank; a second tank over which the containers are passed and adapted to contain a relatively cool liquid; and means for withdrawing such liquid and spraying it over the containers, the liquid thus sprayed falling into said second tank.

2. In a pasteurizer, the combination of a tank containing a pasteurizing liquid; means for passing containers through such liquid; means for withdrawing liquid from the tank and spraying the same over the containers as they pass into and out of said liquid, said sprayed liquid falling back into the tank; a second tank containing a relatively cold liquid; means for withdrawing such liquid and spraying it over the containers and back into the tank as the containers pass over said second tank; and mechanism for removing the containers from the means employed to advance the same.

3. In a pasteurizer, the combination of a tank containing a pasteurizing liquid; means for withdrawing liquid therefrom and discharging the same in the form of a spray adjacent the intake and discharge ends of the tank and directly back into the the tank; a second tank adapted to contain a cooling liquid; means for withdrawing liquid therefrom and discharging it in the form of a spray above said tank and back into the tank; an endless conveyer passing into and through the liquid in the first tank and over the second tank; and means for automatically removing containers from the conveyer and transferring them laterally from the apparatus.

4. In a pasteurizer, the combination of a tank containing a pasteurizing liquid; means for passing containers therethrough; baffle-plates located in the lower portion of the tank adjacent the head end thereof; and means for withdrawing liquid from the tank at a point intermediate said plates and the head of the tank and spraying it on the containers and back into the tank as the containers pass into and out of the tank.

5. In a pasteurizer, the combination of a tank containing a pasteurizing liquid; means for passing containers therethrough; vertically-adjustable baffle-plates located in the lower portion of the tank adjacent the head end thereof; and means for withdrawing liquid from the tank at a point intermediate said plates and the head of the tank and spraying it on the containers and back into the tank as the containers pass into and out of the tank.

In testimony whereof I have signed my name to this specification.

OTTO EICK.